(12) United States Patent
Brannon

(10) Patent No.: US 9,544,306 B2
(45) Date of Patent: Jan. 10, 2017

(54) ATTEMPTED SECURITY BREACH REMEDIATION

(71) Applicant: Sky Socket, LLC, Atlanta, GA (US)

(72) Inventor: Jonathan Blake Brannon, Mableton, GA (US)

(73) Assignee: AirWatch LLC, Atlanta, GA (US)

( * ) Notice: Subject to any disclaimer, the term of this patent is extended or adjusted under 35 U.S.C. 154(b) by 234 days.

(21) Appl. No.: 14/062,309

(22) Filed: Oct. 29, 2013

(65) Prior Publication Data

US 2014/0053238 A1 Feb. 20, 2014

(51) Int. Cl.

| | |
|---|---|
| G06F 21/00 | (2013.01) |
| H04L 29/06 | (2006.01) |
| G06F 21/55 | (2013.01) |
| H04L 9/32 | (2006.01) |
| G06F 21/31 | (2013.01) |
| G06F 21/45 | (2013.01) |

(52) U.S. Cl.
CPC ........... *H04L 63/0861* (2013.01); *G06F 21/31* (2013.01); *G06F 21/316* (2013.01); *G06F 21/45* (2013.01); *G06F 21/55* (2013.01); *H04L 9/3231* (2013.01); *H04L 63/20* (2013.01)

(58) Field of Classification Search
CPC .............................. H04L 63/20; H04L 63/0861
See application file for complete search history.

(56) References Cited

U.S. PATENT DOCUMENTS

| | | | |
|---|---|---|---|
| 4,679,226 A | 7/1987 | Muehleisen | |
| 5,237,614 A | 8/1993 | Weiss | |
| 5,446,888 A | 8/1995 | Pyne | |
| 5,574,786 A | 11/1996 | Dayan et al. | |
| 5,625,869 A | 4/1997 | Nagamatsu et al. | |
| 5,631,947 A | 5/1997 | Wittstein et al. | |
| 5,799,068 A | 8/1998 | Kikinis et al. | |

(Continued)

FOREIGN PATENT DOCUMENTS

| | | |
|---|---|---|
| CA | 2149337 A1 | 6/1994 |
| GB | 2309860 A | 5/2000 |

(Continued)

OTHER PUBLICATIONS

Asynchrony Software, Inc., "PDA Defense User Guide", 2002.

(Continued)

*Primary Examiner* — Jeffrey Pwu
*Assistant Examiner* — William Corum, Jr.

(57) ABSTRACT

Methods, systems, apparatuses, and computer program products are provided for remediating suspected attempted security breaches. For example, a method is provided that includes receiving information regarding at least one authentication attempt and determining, based at least in part on the information regarding the at least one authentication attempt, whether the at least one authentication attempt comprises a suspected attempted security breach. The method further includes causing, in an instance in which it is determined that the at least one authentication attempt comprises a suspected attempted security breach, at least one recording to be captured via at least one recording device communicatively coupled to the at least one processor and causing at least a portion of the at least one recording to be compared against at least one database.

20 Claims, 6 Drawing Sheets

(56) References Cited

U.S. PATENT DOCUMENTS

| | | |
|---|---|---|
| 5,826,265 A | 10/1998 | Van Huben et al. |
| 5,864,683 A | 1/1999 | Boebert et al. |
| 5,870,459 A | 2/1999 | Phillips et al. |
| 5,928,329 A | 7/1999 | Clark et al. |
| 5,933,515 A | 8/1999 | Pu et al. |
| 5,961,590 A | 10/1999 | Mendez et al. |
| 5,966,081 A | 10/1999 | Chesnutt |
| 5,974,238 A | 10/1999 | Chase, Jr. |
| 5,987,609 A | 11/1999 | Hasebe |
| 6,006,332 A | 12/1999 | Rabne et al. |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,766,456 B1 | 7/2004 | McKeeth |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,099,332 B2 | 1/2012 | Lemay et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,225,381 B2 | 7/2012 | Lemke |
| 8,359,016 B2 | 1/2013 | Lindeman et al. |
| 8,433,620 B2 | 4/2013 | Futty et al. |
| 8,504,831 B2 | 8/2013 | Pratt et al. |
| 8,842,006 B2 * | 9/2014 | Anderson ............... 340/539.26 |
| 2002/0013721 A1 | 1/2002 | Dabbiere et al. |
| 2002/0049644 A1 | 4/2002 | Kargman |
| 2002/0055967 A1 | 5/2002 | Coussement |
| 2002/0098840 A1 | 7/2002 | Hanson et al. |
| 2003/0065934 A1 | 4/2003 | Angelo et al. |
| 2003/0110084 A1 | 6/2003 | Eberhard et al. |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2004/0098715 A1 | 5/2004 | Aghera et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0071748 A1 | 3/2005 | Shipp |
| 2005/0246192 A1 | 11/2005 | Jauffred et al. |
| 2006/0075263 A1* | 4/2006 | Taylor ............................ 713/194 |
| 2006/0093190 A1* | 5/2006 | Cheng et al. ................. 382/115 |
| 2006/0190984 A1 | 8/2006 | Heard et al. |
| 2007/0016613 A1 | 1/2007 | Foresti et al. |
| 2007/0033397 A1 | 2/2007 | Phillips, II et al. |
| 2007/0093243 A1 | 4/2007 | Kapadekar et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2008/0051076 A1 | 2/2008 | O'Shaughnessy et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0253410 A1 | 10/2009 | Fitzgerald et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |

(56) References Cited

U.S. PATENT DOCUMENTS

| | | | |
|---|---|---|---|
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0207721 A1* | 8/2010 | Nakajima | G06F 21/552 340/5.3 |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2011/0004941 A1 | 1/2011 | Mendez et al. | |
| 2011/0082900 A1 | 4/2011 | Nagpal et al. | |
| 2011/0113062 A1 | 5/2011 | Quinlan et al. | |
| 2011/0145932 A1 | 6/2011 | Nerger et al. | |
| 2011/0153779 A1 | 6/2011 | Mendez et al. | |
| 2011/0153799 A1 | 6/2011 | Ito | |
| 2011/0167474 A1 | 7/2011 | Sinha et al. | |
| 2011/0202589 A1 | 8/2011 | Piernot et al. | |
| 2011/0225252 A1 | 9/2011 | Bhat et al. | |
| 2011/0270799 A1 | 11/2011 | Muratov | |
| 2011/0276805 A1 | 11/2011 | Nagpal et al. | |
| 2011/0296186 A1 | 12/2011 | Wong et al. | |
| 2011/0320552 A1 | 12/2011 | Friedman et al. | |
| 2012/0005578 A1 | 1/2012 | Hawkins | |
| 2012/0015644 A1 | 1/2012 | Danford et al. | |
| 2012/0102392 A1 | 4/2012 | Reesman et al. | |
| 2012/0198547 A1 | 8/2012 | Fredette et al. | |
| 2012/0204032 A1 | 8/2012 | Wilkins et al. | |
| 2013/0061307 A1 | 3/2013 | Livne | |
| 2013/0086466 A1 | 4/2013 | Levy et al. | |
| 2013/0152169 A1 | 6/2013 | Stuntebeck | |
| 2013/0232540 A1* | 9/2013 | Saidi | G06F 21/6218 726/1 |
| 2014/0007184 A1* | 1/2014 | Porras | G06F 21/53 726/1 |
| 2014/0007223 A1* | 1/2014 | Han et al. | 726/16 |
| 2014/0031011 A1* | 1/2014 | West | G06F 21/44 455/411 |
| 2014/0040622 A1* | 2/2014 | Kendall | G06F 21/602 713/171 |
| 2014/0230033 A1* | 8/2014 | Duncan | 726/7 |
| 2014/0282877 A1* | 9/2014 | Mahaffey | H04L 63/0853 726/3 |
| 2015/0052595 A1* | 2/2015 | Murphy | G06F 21/54 726/7 |

FOREIGN PATENT DOCUMENTS

| | | |
|---|---|---|
| GB | 2309860 B | 5/2000 |
| GB | 2346716 A | 8/2000 |
| JP | 07141245 A | 6/1995 |
| JP | 08251660 A | 9/1996 |
| WO | 9704389 A1 | 2/1997 |
| WO | 9922322 A1 | 5/1999 |
| WO | 0241661 A2 | 5/2002 |

OTHER PUBLICATIONS

Belani, Eshwar et al., "The CRISIS Wide Area Security Architecture", 1998.
Benaloh, Josh et al., "Patient Controlled Encryption: Ensuring Privacy of Electronic Medical Records", Nov. 13, 2009.
Fox, Armando et al., "Security on the Move: Indirect Authentication Using Kerberos", 1996.
Gong, Li et al., "Multicast Security and Its Extension to a Mobile Environment", Oct. 1995.
Infinite Technologies, "Infinite Interchange", 1997.
Kiiskinen, Jani et al., "Data Channel Service for Wireless Telephone Links", Jan. 1996.
Latedroid, "JuiceDefender", Jan. 15, 2012.
Menaria, Pankaj et al., "Security in Mobile Database Systems", Mar. 17, 2011.
Nokia, , "Nokia 9000i Owner's Manual", 1997.
Pfitzmann, Andreas et al., "Mobile User Devices and Security Modules: Design for Trustworthiness", Feb. 5, 1996.
Ratner, David et al., "Replication Requirements in Mobile Environments", Nov. 2001.
Ratner, David H. , "Roam: A scalable Replication System for Mobile and Distributed Computing", Jan. 1998.
Research in Motion, , "Blackberry Wireless Handheld 5810 Getting Started Guide", Jan. 15, 2003.
Research in Motion, , "Blackberry Wireless Handheld 5810 Quick Reference Guide", 2003.
Research in Motion, , "Blackberry Wireless Handheld 5810 User Guide", 2003.
Stajano, Frank et al., "The Thinnest of Clients: Controlling It All Via Cellphone", Mobile Computing and Communications Review, vol. 2, No. 4, Oct. 1998.
Steiner, Jennifer , "Kerberos: An Authentication Service for Open Network Systems", Jan. 12, 1988.
Strunk, John et al., "Self-Securing Storage: Protecting Data in Compromised Systems", Symposium on Operating Systems Design and Implementation, 2000.
"MobiLink Synchronization User's Guide", Part No. 38132-01-0800-01, Nov. 2001.
Symantec Corporation, "Creating Norton pcAnywhere Scripts", 1994.
Traveling Software, Inc., , "LapLink for Windows 95", 1996.
Wachowicz, Moniza et al., "Combining Location and Data Management in an Environment for Total Mobility", In Proceedings of the International Workshop on Information Visualization and Mobile Computing, 1996.
Xcellenet, Inc., , "RemoteWare Client for Windows NT and Windows 95 User's Guide", 1996.
Xcellenet, Inc., , "RemoteWare Forms and RemoteWare Query", 1994.
Xcellenet, Inc., , "RemoteWare Forms Getting Started Guide", 1994.
Xcellenet, Inc., , "RemoteWare Server for Windows NT", 1996.
Xcellenet, Inc., , "RemoteWare Server Operations Guide", 1992.
Asynchrony Software, Inc., "PDA Defense User Guide", 726, 2002.
Belani, Eshwar et al., "The CRISIS Wide Area Security Architecture", 726, 1998.
Benaloh, Josh et al., "Patient Controlled Encryption: Ensuring Privacy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726, Feb. 5, 1996.
Steiner, Jennifer , "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.
Do, Khang D. , "NFOA in U.S. Appl. No. 13/316,073", Non-Final Office Action Cited in U.S. Appl. No. 13/316,073 dated Jan. 18, 2013, Jan. 18, 2013.
"Nokia 9000i Owner's Manual", 1997.
Research in Motion, "Blackberry Wireless Handheld 5810 Getting Started Guide", Jan. 15, 2003.
Research in Motion, "Blackberry Wireless Handheld 5810 Quick Reference Guide", 2003.
Research in Motion, "Blackberry Wireless Handheld 5810 User Guide", 2003.
SYBASE, , "MobiLink Synchronization User's Guide", Part No. 38132-01-0800-01, Nov. 2001.
Traveling Software, Inc. "LapLink for Windows 95", 1996.

(56) References Cited

OTHER PUBLICATIONS

Office Action mailed Jun. 25, 2015 in U.S. Appl. No. 14/094,331, filed Dec. 2, 2013.

* cited by examiner

ATTEMPTED SECURITY BREACH REMEDIATION

FIELD OF APPLICATION

Embodiments of the present invention relate generally to electronic device security and, more particularly, to systems, methods, apparatuses, and computer program products for providing remedial actions in response to attempted security breaches.

BACKGROUND

Various authentication schemes are used to restrict access to electronic devices and ensure that only authorized users may gain access to sensitive resources. Any authentication scheme, however, may be susceptible to being breached. For example, common authentication schemes such as password or PIN challenges may be defeated by simple brute force attacks, i.e., attempting various passwords or PINs until one works.

Regardless of the authorization scheme being used, a need exists for detecting attempted security breaches and for responding with appropriate remediation measures.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

According to one example embodiment, a method is provided that includes receiving information regarding at least one authentication attempt and determining, based at least in part on the information regarding the at least one authentication attempt, whether the at least one authentication attempt comprises a suspected attempted security breach. The method of the example embodiment further comprises, in an instance in which it is determined that the at least one authentication attempt comprises a suspected attempted security breach, causing at least one recording to be captured and causing at least a portion of the at least one recording to be compared against at least one database. According to another example embodiment, the method may further include causing at least one remedial action to be performed, the remedial action being determined based at least in part on a result of comparing the at least one recording against the at least one database.

According to another example embodiment, an apparatus is provided that includes at least one processor and at least one memory storing program code instructions. The at least one memory and program code instructions of the example embodiment are configured to, with the at least one processor, direct the apparatus to at least receive information regarding at least one authentication attempt and determine, based at least in part on the information regarding the at least one authentication attempt, whether the at least one authentication attempt comprises a suspected attempted security breach. The apparatus of this example embodiment is further directed to, in an instance in which it is determined that the at least one authentication attempt comprises a suspected attempted security breach, cause at least one recording to be captured and cause at least a portion of the at least one recording to be compared against at least one database. According to another example embodiment, the apparatus may be further directed to cause at least one remedial action to be performed, the remedial action being determined based at least in part on a result of comparing the at least one recording against the at least one database.

According to yet another example embodiment, a computer program product is provided, the computer program product including a computer-readable storage medium having program code portions embodied therein. The program code portions of the example embodiment are configured to, upon execution, direct an apparatus to at least receive information regarding at least one authentication attempt and determine, based at least in part on the information regarding the at least one authentication attempt, whether the at least one authentication attempt comprises a suspected attempted security breach. The program code portions of this example embodiment are further configured to, upon execution, direct the apparatus to, in an instance in which it is determined that the at least one authentication attempt comprises a suspected attempted security breach, cause at least one recording to be captured and cause at least a portion of the at least one recording to be compared against at least one database. According to another example embodiment, the apparatus may be further directed to cause at least one remedial action to be performed, the remedial action being determined based at least in part on a result of comparing the at least one recording against the at least one database.

According to another example embodiment, an apparatus is provided that includes means for receiving information regarding at least one authentication attempt and means for determining, based at least in part on the information regarding the at least one authentication attempt, whether the at least one authentication attempt comprises a suspected attempted security breach. The apparatus of this example embodiment further includes means for causing at least one recording to be captured via at least one recording device communicatively coupled to the at least one processor and means for causing at least a portion of the at least one recording to be compared against at least one database, in an instance in which it is determined that the at least one authentication attempt comprises a suspected attempted security breach.

According to another example embodiment, a method is provided that includes receiving at least one recording captured and/or transmitted in response to a determination that an authentication attempt comprises a suspected attempted security breach and causing at least a portion of the recording to be compared against at least one database. The method of this example embodiment further includes receiving a result of the comparison and causing one or more remedial actions to be performed, the one or more remedial actions being determined based at least in part on the result of the comparison.

According to yet another example embodiment, an apparatus is provided that includes at least one processor and at least one memory storing program code instructions. The at least one memory and program code instructions of the example embodiment are configured to, with the at least one processor, direct the apparatus to at least receive at least one recording captured and/or transmitted in response to a determination that an authentication attempt comprises a suspected attempted security breach and cause at least a portion of the recording to be compared against at least one database. The apparatus of this example embodiment is further directed to receive a result of the comparison and cause one or more remedial actions to be performed, the one or more remedial actions being determined based at least in part on the result of the comparison.

According to another example embodiment, a computer program product is provided, the computer program product including a computer-readable storage medium having program code portions embodied therein. The program code portions of the example embodiment are configured to, upon execution, direct an apparatus to at least receive at least one recording captured and/or transmitted in response to a determination that an authentication attempt comprises a suspected attempted security breach and cause at least a portion of the recording to be compared against at least one database. The program code portions of this example embodiment are further configured to, upon execution, direct the apparatus to receive a result of the comparison and cause one or more remedial actions to be performed, the one or more remedial actions being determined based at least in part on the result of the comparison.

According to another example embodiment, an apparatus is provided that includes means for receiving at least one recording captured and/or transmitted in response to a determination that an authentication attempt comprises a suspected attempted security breach and means for causing at least a portion of the recording to be compared against at least one database. The apparatus of this example embodiment further includes means for receiving a result of the comparison and causing one or more remedial actions to be performed, the one or more remedial actions being determined based at least in part on the result of the comparison.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
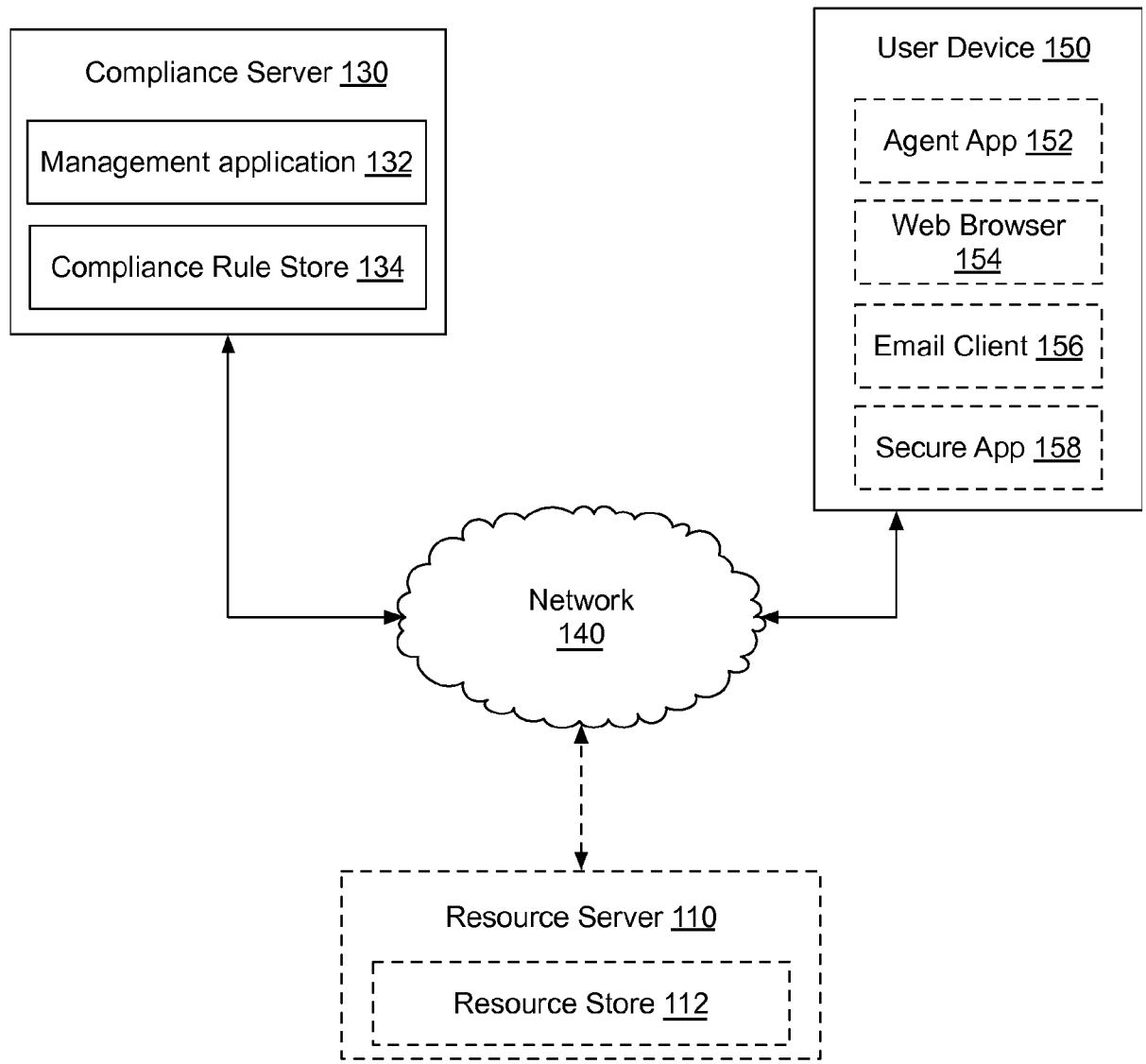
FIG. 1 is a schematic representation of an example system which may be configured according to example embodiments of the present invention.

The present invention now will be described more fully hereinafter with reference to the accompanying drawings, in which some, but not all embodiments of the inventions are shown. Wherever possible, the same reference numbers are used in the drawings and the following description to refer to the same or similar elements. While embodiments of the disclosure may be described, modifications, adaptations, and other implementations are possible. For example, substitutions, additions, subtractions and/or modifications may be made to the elements illustrated in the drawings, as indicated in some cases via dashed lines, and the methods described herein may be modified by substituting, reordering, or adding stages to the disclosed methods. Indeed, the present invention may be embodied in many different forms and should not be construed as limited to the embodiments set forth herein; rather, these embodiments are provided so that this disclosure will satisfy applicable legal requirements. Accordingly, the following detailed description does not limit the disclosure. Instead, the proper scope of the disclosure is defined by the appended claims.

As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as the term will be used herein, "circuitry" may refer to hardware-only circuit implementations (e.g., implementations in analog circuitry and/or digital circuitry); combinations of circuits and computer program product(s) including software and/or firmware instructions stored on one or more, i.e., at least one, computer readable memories that work together to cause an apparatus to perform one or more functions described herein; and circuits, such as, for example, one or more microprocessors or portions of one or more microprocessors, that require software or firmware for operation even if the software or firmware is not physically present. This definition of "circuitry" is applicable to all uses of this term, including in any claims. As another example, the term "circuitry" also includes implementations comprising one or more processors and/or portion(s) thereof and accompanying software and/or firmware. As another example, the term "circuitry" also includes, for example, an integrated circuit or applications processor integrated circuit for a portable communication device or a similar integrated circuit in a server, a network device, and/or other computing device.

As defined herein, a "computer-readable storage medium" refers to a non-transitory physical storage medium (e.g., volatile or non-volatile memory device), and can be differentiated from a "computer-readable transmission medium," which refers to an electromagnetic signal. Furthermore, "at least one" and "one or more" both, as used herein, refer to any non-zero quantity and will be used interchangeably herein.

The present application is generally directed to electronic device security and, more particularly, to systems, methods, apparatuses, and computer program products for providing remedial actions in response to attempted security breaches. As used herein, an attempted security breach refers to any attempt, whether successful or not, to gain unauthorized access to an electronic device (e.g., access to data, resources, functionality and/or the like that are accessible via the electronic device and/or access to the electronic device itself), such as by an unauthorized user.

Example embodiments of such attempted security breach remediation systems, methods, apparatuses, and computer program products may be configured to cause various remedial actions to be performed in response to determining that a suspected attempted security breach has occurred. For example, embodiments may be configured to determine that a suspected attempted security breach has occurred and, in response, cause a recording to be captured. This recording may, for example, comprise a photo, an audio recording, a recording comprising biometric information, and/or another type of recording. Example embodiments may further cause at least a portion of the recording to be compared against a database. Thus, for example, some example embodiments might detect that an attempted security breach has occurred because a user has entered a suspicious number of incorrect passwords in a row and, having determined that a suspected security breach has occurred, might cause a photo to be captured of the user. Example embodiments might further cause this photo to be compared against a database, for example of employees or criminals. Based on this comparison, an appropriate remedial action may be determined and performed.

For example, comparing the photo against the database may reveal that an authorized user was attempting to access the device and has merely forgotten their password. The user may thus be presented with an alternative authorization option and/or an option to reset their password. In another instance, comparing the photo against the database may reveal that a known criminal or an unauthorized user is responsible for the failed authorization attempts. Accordingly, an example embodiment may cause the police or a system administrator to be contacted, cause the device to be wiped, cause the device to be locked, cause the device to engage one or more location services, and/or cause various other actions to be performed. Many other example embodiments are possible, some of which will be described below.

According to another aspect of the present application, systems, methods, apparatuses, and computer program products for providing advanced authentication techniques are described. Example embodiments of such advanced authentication techniques may, for example, combine biometric signatures and sequence-based passcodes or the like into composite authentication credentials. For example, some embodiments may receive biometric information, such as fingerprint data or the like, in a particular sequence or order, thereby allowing a user whose biometric information has been compromised (e.g., copied, spoofed, or the like) to still maintain a degree of control over their authentication credentials. As a specific example, an authentication technique involving scanning fingerprints in a particular order (e.g., ring, ring, index, thumb) may be provided, such that the order may be changed at the election of the user. Similar techniques may be provided for use with other biometric signatures, such as iris scanning (e.g., by blinking and/or winking in a particular pattern). Additional layers of authentication may also be added to these example embodiments, such as by implementing fingerprint scanning into a PIN entry device, such that the PIN itself, the sequence of fingers used to enter the PIN, and the fingerprints themselves may together form a robust composite authentication credential.

Having thus provided an overview of various features and/or functionality that may be provided according to some example embodiments, attention will now be turned to the Figures so that certain example embodiments may be described in more detail.

FIG. 1 illustrates a block diagram of an example attempted security breach remediation system. While FIG. 1 illustrates one example configuration of such a system, numerous other configurations may be used according to example embodiments of the present invention. With reference to FIG. 1, however, the attempted security breach remediation system may include at least one user device(s) 150, and at least one compliance server 130. A resource server 110 and/or other network elements may additionally be provided according to some example embodiments.

The user device(s) 150 may comprise any electronic device configured to communicate over one or more networks, such as the network 140 depicted in FIG. 1. For example, the user device(s) 150 may comprise one or more electronic devices such as a mobile telephone, smartphone, tablet computer, PDA, pager, desktop or laptop computer, a set-top box, a music player, a game console, or any of numerous other fixed or portable communication devices, computation devices, content generation devices, content consumption devices, or combinations thereof.

The resource server 110 may, for example, comprise any type of network-accessible electronic device or system that includes storage, such as the depicted resource store 112. The resource server 110 may, according to one example embodiment, comprise a public server that may be accessible to anyone who connects to it over a network, such as the network 140. According to another example embodiment, the resource server 110 may be a private server accessible only over a private network, such as the network 140, and/or may be located behind a firewall. According to another example embodiment, the resource server 110 may additionally or alternatively require user registration and/or may require use of an authorized user device 150, to access it. The resource server 110 may store any type of data, such as one or more databases, some of which will be described in further detail below.

The compliance server 130 may be any type of network-accessible electronic device or system that includes storage, such as the depicted compliance rule store 134, and may be configured to communicate with the user device(s) 150, and/or the resource server 110 over one or more networks, such as the network 140 depicted in FIG. 1, to provide device, content and/or application management capabilities. For example, the compliance server 130 may comprise cloud-based solutions, server computers and/or any other system configured to provide device, content, and/or application management capability. The compliance server 130 may, according to some example embodiments, further be configured to direct the resource server 110 to transmit data, e.g., to one or more user devices 150, and/or to direct the one or more user device(s) 150 to transmit data, e.g., to the compliance server 130 and/or resource server 110.

The compliance server 130 may comprise a management application 132 and a compliance rule store 134 storing one or more compliance rules, e.g., compliance policies, that may be applicable to the user device(s) 150. While the management application 132 is shown as within the compliance server 130, the management application 132 may additionally or alternately be within the user device(s) 150, and/or remotely located on the resource server 110 and may be remotely updated, such as periodically, via compliance server 130 according to any number of suitable over-the-air (OTA) updating methods.

Attempts by the user device(s) 150 to perform certain functionality, such as viewing, modifying, transmitting, and/or receiving various content, may require the user device to be in compliance with one or more of the compliance rules. Depending on the sensitivity and/or nature of a given functionality, different compliance rules may be necessary to ensure that the functionality is adequately restricted. Some functionality may only require ensuring, e.g., via one or more authentication procedures, that the proper user is requesting the functionality. Other functionality may require compliance with more stringent authorization rules, such as determining whether the functionality is restricted during certain time windows or geographic areas. Accordingly, the user device(s) 150 and/or the compliance server 130 may be operative to determine whether the user of the user device 150 is authorized to perform requested functionality at the time the user requests to perform such functionality.

Compliance server 130 may, for example, use the compliance rules to impose hardware restrictions regarding the use of specific devices and/or specific device features, such as, for instance, cameras, Bluetooth, IRDA, tethering, external storage, a mobile access point, and/or other hardware restrictions. The compliance rules may additionally or alternatively impose software restrictions such as the use of specific wireless device operating systems or applications, internet browser restrictions, screen capture functionality, and/or other software restrictions. Mobile device management restrictions may additionally or alternatively be included in the compliance rules and may comprise encryption requirements, firmware versions, remote lock and wipe functionalities, logging and reporting features, GPS tracking, and/or other mobile device management features.

The compliance server 130 may determine whether one or more device characteristics of a requesting device e.g., the user device(s) 150, satisfy one or more of the restrictions enumerated in the compliance rules. For example, the compliance server 130 may determine that a requesting device that has a camera, BLUETOOTH capability, and is executing a specified version of an operating system is compliant with the compliance rules. As another example, the compliance server 130 may determine that a requesting device that is associated with an external storage unit and has screen capture functionality enabled is not compliant with the compliance rules.

In some embodiments, an agent application 152 executed on the user device(s) 150 may make the compliance determination based on a device profile (e.g., the device profile 252 depicted in FIG. 2), credentials, and/or user preferences. For instance, the agent application 152 may monitor calls by applications, such as the web browser 154, email client 156, secure application 158, and/or any other application, on the user device 150 to an operating system, e.g., the operating system depicted in FIG. 2, of the user device 150 to determine whether the user device 150 seeks to perform functionality associated with one and/or more of the compliance rules described above. Additionally, the agent application 152 executed on the user device(s) 150 may approve and/or deny the associated functionality requests. For instance, the agent application 152 may instruct the operating system on the user device(s) 150 to prevent the device from performing various functionality in response to a determination that a compliance rule, e.g., one or more of the compliance rules 258 stored in the data store 252 depicted in FIG. 2, specifies that such functionality is not authorized.

In some embodiments, the agent application 152 executed on the user device(s) 150 may rely on the compliance server 130 to determine whether a given functionality of the device is authorized according to the compliance rules. For instance, the agent application 152 may transmit information, such as a device profile, access credentials, authentication information, information regarding one or more authentication attempts, and/or information regarding one or more individuals to the compliance server 130 so that compliance server 130 may determine whether the user device 150 seeks to perform functionality that may violate a given compliance rule. Additionally, the compliance server 130 may approve and/or deny the associated functionality requests.

In some embodiments, the compliance rules may comprise device settings and/or executable instructions that define which functionality the operating system of the user device(s) 150 is authorized to perform. Furthermore, the compliance rules may comprise a list of functions, such as those provided by APIs associated with the operating system and/or a platform library, such as the platform library 240 depicted in FIG. 2, that may be treated as protected functions. Viewing, modifying, receiving, and/or transmitting content may, for example, comprise or otherwise be associated with one or more of these functions. Calls to these functions, such as calls to retrieve login credentials, or attempts to interact with (e.g., view, modify, transmit or receive) content, may result in checks by the user device 150, e.g., via the agent application 152, and/or the compliance server 130, e.g., via the management application, for compliance with the compliance rules.

In some embodiments, the agent application 152 may perform a set of ordered operations to accomplish a requested function. These operation sets may be defined on, e.g., stored in a memory of, the user device(s) 150 and/or the compliance server 130 and may comprise one or more operations to determine whether the user device is in compliance with compliance rules from the compliance rule store 134. The agent application 152 may control at least one respective computing resource of the user device(s) 150. The operations may include configuring at least one respective computing resource of the user device(s) such as restricting access to at least one resource managed by the agent application 152, such as one or more of the resources 256 depicted in FIG. 2.

For purposes of convenience, the resource server 110 and compliance server 130 are each referred to herein in the singular, although it will be understood that a plurality of one or both servers may be employed in the arrangements as described herein. For example, in some embodiments, multiple compliance servers 130 and/or resource servers may operate on the same server computer. The components executed on the compliance server 130 and/or resource server 110, may, for example, comprise various applications, services, processes, systems, engines, or functionality not disclosed in detail herein.

As shown in FIG. 1, the user device(s) 150, compliance server 130, and/or resource server 110 may communicate with one another directly and/or via the network 140. The user device(s) 150, compliance server 130, and/or resource server 110 may connect to the network 140 via wired or wireless means, such as via one or more intermediate networks. For example, the user device(s), compliance server 130, and/or resource server 110 may connect with the network 140 via wired means such as Ethernet, USB (Universal Serial Bus), or the like, or via wireless means such as, for example, WI-FI, BLUETOOTH, or the like, or by connecting with a wireless cellular network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

Accordingly, the Network 140 may comprise, for example, one or more wired and/or wireless networks such as one or more wireless local area networks (WLAN), wireless wide area networks (WWAN), Ethernet networks, fiber-optic networks, and/or any other type of wired and/or wireless network now known or later developed. Additionally, the Network 140 may comprise the Internet and/or one or more intranets, extranets, microwave networks, satellite communications networks, cellular networks, infrared communication networks, global area networks, or other suitable networks, etc., or any combination of such networks.

Figure 2:
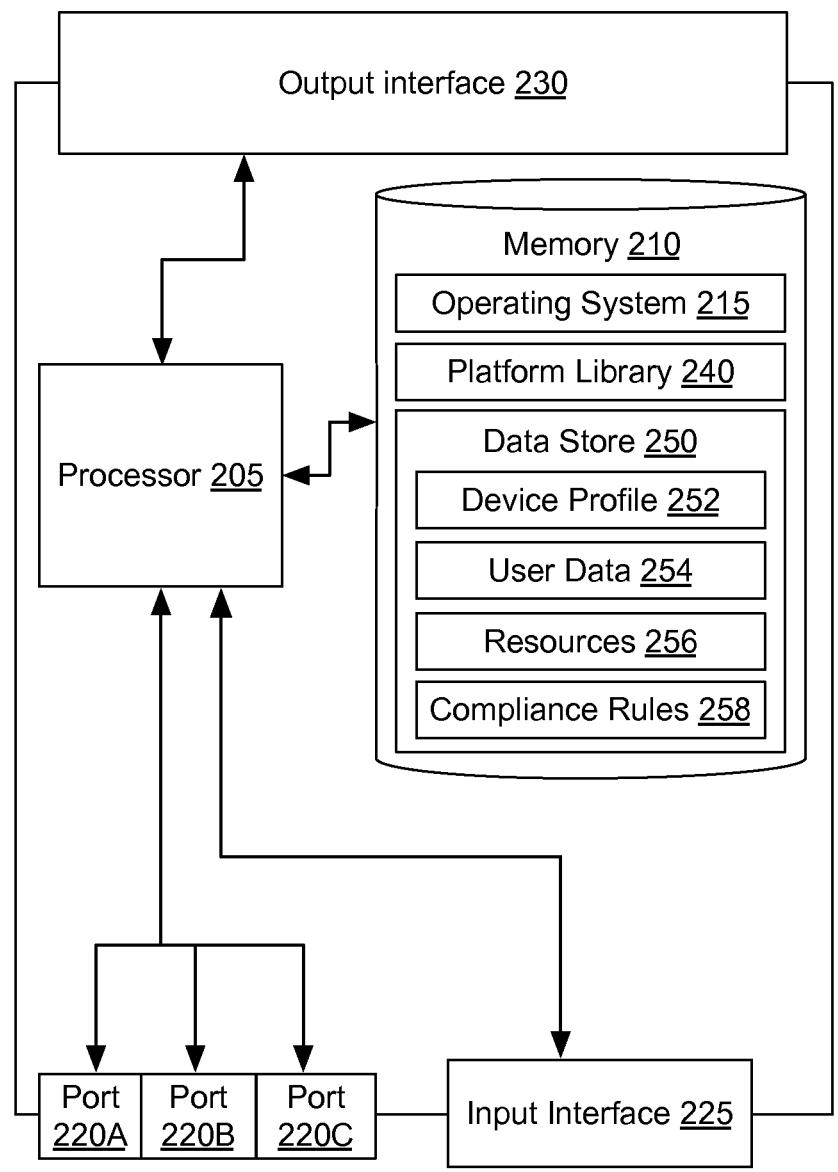
FIG. 2 is a schematic representation of an example user device which may be configured according to example embodiments of the present invention.

Turning now to FIG. 2, a diagram of an example user device 150 is depicted. While FIG. 2 illustrates one example configuration of such a user device, numerous other configurations may be used according to some example embodiments. With reference to FIG. 2, however, the user device 150 may comprise a processor 205, e.g., at least one processor, co-processor, and/or processing circuitry, and at least one memory 210. Depending on the configuration and type of device, the memory 210 may comprise, but is not limited to, volatile (e.g. random access memory (RAM)), non-volatile (e.g. read-only memory (ROM)), flash memory, or any combination thereof. The memory 210 may store executable programs, e.g., program code instructions, and related data components of various applications and modules for execution by the processor 205. The at least one memory 210 may be communicatively connected to the at least one processor 205, e.g., via one or more system busses for transferring data therebetween.

Basic functionality of the user device 150 may be provided by an operating system 215 contained in the at least one memory 210 and executed via the at least one processor 205. One or more programmed software applications may be executed by utilizing the computing resources in user device 150. For example, applications stored in the memory 210 may be executed by the processor 205 under the auspices of operating system 215. For example, processor 205 may be configured to execute applications such as web browsing applications, email applications, instant messaging applications, applications configured to view and/or manipulate content, and/or other applications capable of receiving and/or providing data.

Data provided as input to and/or generated as output from the application(s) may be stored in the memory 210 and read by the processor 205 from the memory 210 as needed during the course of application program execution. Input data may be data stored in the memory 210 by a secondary application or other source, either internal or external to user device 150, or provided during installation of the application.

The user device 150 may include one or more communication ports, such as the communication ports 220(A)-(C) depicted in FIG. 2. It will be understood that although three communication ports are depicted in the example user device 150 depicted in FIG. 2, any number of such ports may be present according to other example configurations of a user device 150. Such communication ports 120(A)-(C) may allow the user device 150 to communicate with other devices, such as other user devices 150, the compliance server 130, and/or the resource server 110, and may comprise components such as a wireless network connectivity interface, an Ethernet network adapter, and/or a modem. For example, the wireless network connectivity interface may comprise one and/or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, the communication ports 120(A)-(C) may additionally or alternatively include one or more antennas, supporting hardware and/or software, and/or supporting circuitry configured to receive and/or transmit signals according to any short-range communication protocols and/or standards, such as, for example, near field communication (NFC), BLUETOOTH, and/or BLUETOOTH Low Energy (BLE). According to some embodiments, the communication ports 120(A)-(C) may additionally or alternatively include one or more interfaces configured to provide location services, such as one or more antennas, supporting hardware and/or software, and/or supporting circuitry configured to receive signals transmitted from GPS satellites.

The user device 150 may also receive data as user input via an input interface 225, such as one or more of a keyboard, a mouse, a pen, a stylus, a sound input device, a touch input device, a biometric device, a capture device, a brain-computer interface (BCI), etc. The input interface 225 may additionally or alternatively comprise one or more sensing devices, such as one or more cameras, microphones, motion detectors, proximity sensors, biometric sensors and/or the like, which may be configured to capture visual, aural, physical, and/or other types of stimuli and/or information, such as spoken words, motions, gestures, biometric signatures and/or the like.

Data generated by applications may be caused to be stored in the memory 210 by the processor 205 during the course of application program execution. Data may be provided to the user of the user device 150 during application program execution by means of an output interface 230. The output interface 230 may comprise one or more devices configured to provide information and/or stimuli to a user, such as one or more display devices; speakers; force, vibration, and/or haptic feedback generating devices; implanted and/or physiologically-integrated output devices; heads-up display devices, and/or the like. It will be understood that although the input and output interfaces 225, 230 are depicted as distinct components in FIG. 2, they may, according to example embodiments, be embodied by one or more components comprising both input and output functionality. For example, the input and output interface 225, 230 may comprise a touchscreen device, e.g., a display device configured to both display information and receive user input, such as via a touch detection interface.

The at least one memory 210 may also comprise a platform library 240. The platform library 240 may comprise one or more collections of functionality, e.g., utilities, useful to multiple applications, such as may be provided by an application programming interface (API) to a software development kit (SDK). These utilities may be accessed by applications as necessary so that each application does not have to contain these utilities, thus allowing for memory consumption savings and a consistent user experience. The platform library 240 may also provide functionality associated with app-wrapping, defined herein as adding additional functionality (referred herein as "wrapper-provided functionality") to applications without affecting (or, in some cases, only minimally affecting) the application's preexisting, or "stock" functionality. For example, an existing game application may be wrapped to provide support for compliance rules such as those that prohibit the application from executing during work hours; the game's functionality would be unaffected during non-work hours. Similarly, an existing application may be wrapped to require user authentication before the application may be accessed. As will be discussed below, some example embodiments may provide security breach remediation functionality to applications via wrapping. The platform library 240 is described in greater detail below with respect to FIG. 3.

Furthermore, embodiments of this disclosure may be practiced in conjunction with a graphics library, other operating systems, or any other application program and is not limited to any particular application or system. The devices described with respect to the Figures may have additional features or functionality. For example, user device 150 may also include additional data storage devices (removable and/or non-removable) such as, for example, magnetic disks, optical disks, or tape (not shown).

The user device 150 may store in the memory 210, e.g., in a data store 250, a device profile 252 and user data 254. The device profile 252 may, for example, comprise information such as an indication of a current position of user device 150 and/or indications of various hardware, software, and/or security attributes pertaining to the user device 150. For instance, the device profile 252 may represent hardware specifications of the user device 150, version and/or configuration information of various software program and/or hardware components installed on user device 150, data transmission protocols enabled on user device 150, version and usage information of the various resources 256 stored on user device 150, and/or any other attributes associated with the state of user device 150. The device profile 252 may additionally or alternatively comprise operational status information, such as information regarding any errors or faults detected in the user device 150; information regarding device temperature; information regarding resource levels such as battery levels, free storage space, and/or signal strengths; and/or the like. The device profile 252 may additionally or alternatively comprise data indicating a date of last virus scan of the user device 150, a date of last access of the user device 150 by an IT representative, a date of last service of the user device 150 by an IT representative, and/or any other data indicating maintenance and/or usage of the user device 150. The device profile 252 may additionally or alternatively comprise indications of past behavior of associated users, such as resources accessed, charges for resource accesses, and/or inventory accessed from such resources.

The user data 254 may comprise information regarding one or more users of the user device 150. For example, the user data 254 may comprise one or more user preferences, e.g., one or more parameters that may affect the experience of the user. Additionally or alternatively, the user data 254 may include indications of a device user's age, gender, bodily traits, preferred resource types, preferred venue resources, and/or any other type of information relating to a user or combinations of such information. Additionally or alternatively, the user data 254 may include indications of one or more access levels, roles, policy groups, or the like of a device user, e.g., for use in providing varying levels of functionality and/or access (e.g., to protected content), for different users of a given user device.

The user device 150 may also store at least one resource 256 in the data store 250. The resources 256 may, for example, include any data or content, such as databases, applications, audio/video content, electronic records, applications and/or application files, and/or the like. More specifically, resources 256 may include at least one of the following file types: data files, audio files, video files, three-dimensional image files, raster image files, vector image files, page layout files, text files, word processor files, spreadsheet files, presentation files, graphic files, audio files, photographic files, video files, database files, executable files, CAD files, web files, plug-in files, font files, system files, settings files, encoded files, compressed files, disk image files, developer files, backup files, and/or any other files.

Figure 3:
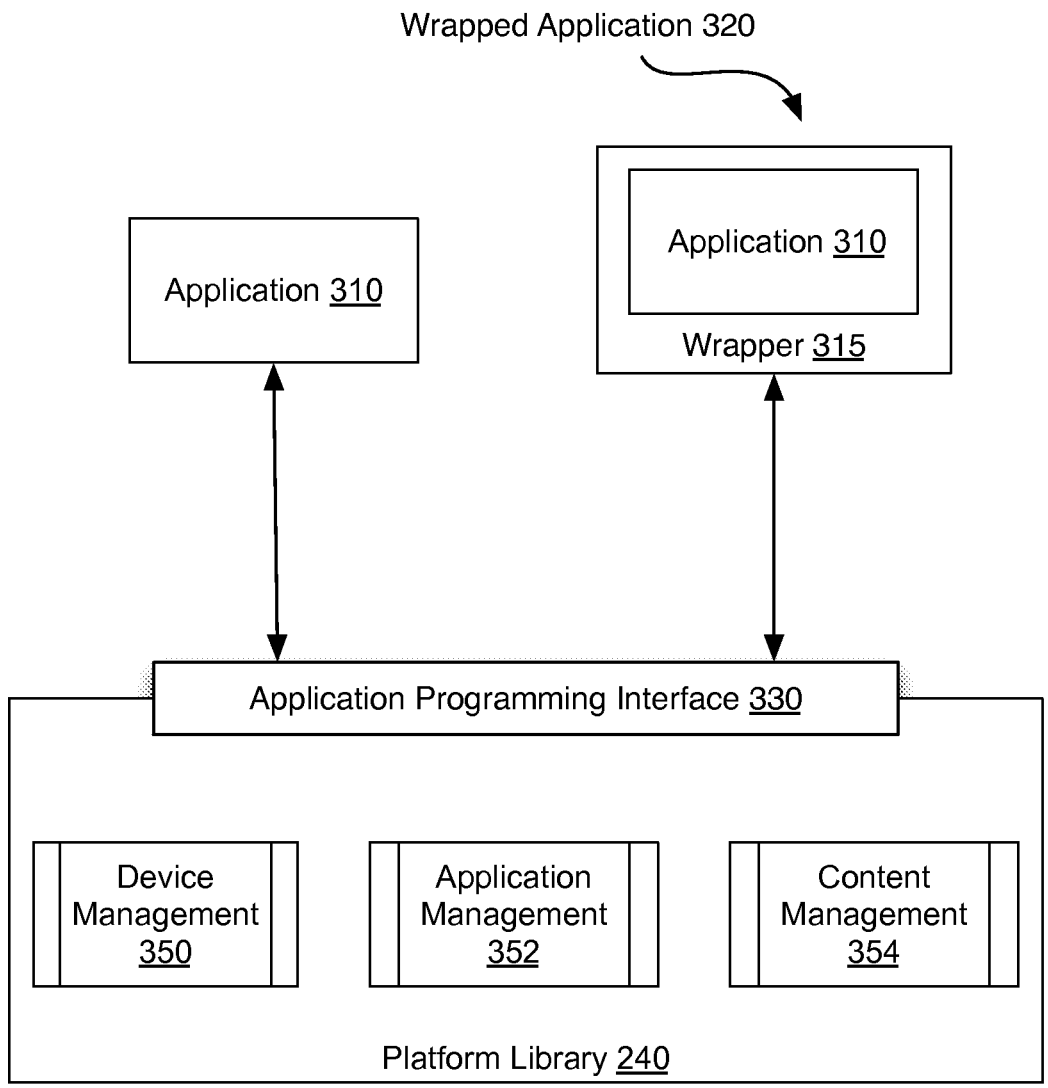
FIG. 3 is a block diagram of a platform library associated with the user device.

FIG. 3 is a block diagram illustrating greater detail regarding the platform library 240. An application 310 and/or a wrapped application 320 may communicate with platform library 140 via a plurality of function calls comprising an application programming interface (API) 330. In some embodiments, application 310 and wrapped application 320 may utilize the same calls. In some embodiments, application 310 and wrapped application 320 may utilize different function calls despite being associated with the same and/or similar functionality. The function calls may allow the applications to access various features and functionality provided by the platform library 140, such as a set of device management functions 350, a set of application management functions 352, and/or a set of content management functions 354.

Wrapped application 320 may comprise a binary executable file whose functionality has been modified by the addition of an application wrapper 315. The application wrapper 315 may, for example, comprise a program or application that encapsulates the application 310, serving as an intermediary between the application 310 and the operating system 215 and/or platform library 240. In this way, the application wrapper 315 may modify, e.g., add to, restrict, enhance, etc., any of the "stock" functionality provided by the application 310. For example, if application 310 is configured to be accessible without requesting user authentication, wrapper 315 may add to the functionality of the application 310 by requiring authentication before a user can access the application 310. Similarly, if application 310 is configured to communicate over an unsecured (e.g., unencrypted) connection with a given public server, the wrapper 315 might modify this functionality by forcing the communication to take place over a secured connection or even by preventing the communication altogether. The modifications provided by the wrapper 315 may, for example, comprise precompiled functions that may call out to an API, such as the API 330 depicted in FIG. 3. Thus, app-wrapping may allow additional, "wrapper-provided" functionality to be added to an existing application, such as the application 310 depicted in FIG. 3. In some embodiments, app-wrapping may be accomplished dynamically upon installation and/or execution of an application without requiring recompilation of the application's source code. App-wrapping may thus comprise a preferred and/or more convenient means of modifying an application and may, according to some embodiments, even be used in instances in which source code for the application 310 is unavailable.

In some embodiments, compliance rules such as those provided by the compliance server 220 may control which functions of the API 330 are enabled and/or used in the application 310 and wrapped application 320. For example, users in a sales group may be permitted by the compliance server 220 to download an enterprise's expense submitting application without modification, while users in an accounting group may receive a modified version of the same application. The modified version may rely on functionality provided by the platform library 240 to enhance the application's security, such as by adding a call to an encryption function for communications from the application that are intended for transmission over the network 140.

Various functions may be provided by the platform library 240, including authentication, authorization, and determination functions. Device management functions 350 may comprise, for example, functions operative to determine whether user device 100 has been compromised, e.g., "rooted," "jailbroken," or the like, and/or to identify a location of the device via evoking and/or accessing one or more location services of the device, such as a GPS service and/or a signal (e.g., cellular or WIFI) triangulation-based service. Application management functions 352 may comprise, for example, functions operative to encrypt data and/or communications used by application 310 and wrapped application 320, to distribute configuration information, to provide authorization and/or credentials, and/or to provide logging and reporting functionality. Content management functions 354 may comprise, for example, functions to update shared content data used by application 310 and wrapped application 320 and/or to provide branding functionality to alter the appearance of application 310 and wrapped application 320.

Other management functionality may comprise enforcing compliance rules and/or restrictions distributed by compliance server 220, which may be accomplished at the device, application, and/or content level. Such compliance rules may comprise time, date and/or location based restrictions on accessing user device 100, application 310, wrapped application 320, local assets 156, and/or remote assets 212.

Figure 4:
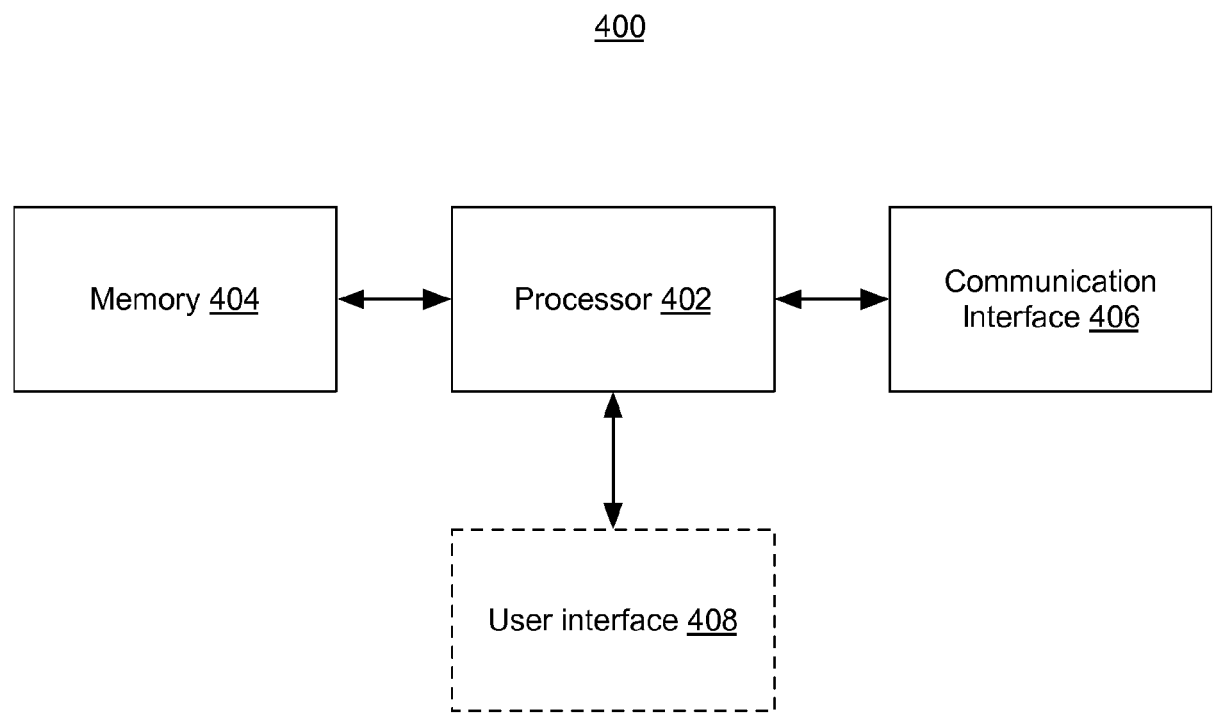
FIG. 4 is a schematic representation of an example apparatus that may be embodied by or otherwise associated with one or more electronic devices and which may be configured to implement example embodiments of the present invention.

Example embodiments of the invention will now be described with reference to FIG. 4, in which certain elements of an apparatus 400 for implementing various functionality of the example embodiments are depicted. In order to implement such functionality, the apparatus 400 of FIG. 4 may be employed, for example, in conjunction with one or more of the user device(s) 150, the compliance server 130, and/or the resource server 110 depicted in FIG. 1. However, it should be noted that the apparatus 400 of FIG. 4 may also be employed in connection with a variety of other devices, both mobile and fixed, in order to implement the various functionality of the present invention and therefore, embodiments of the present invention should not be limited to those depicted. It should also be noted that while FIG. 4 illustrates one example of a configuration of an apparatus 400 for implementing the functionality of the present invention, numerous other configurations may additionally or alternatively be used to implement embodiments of the present invention. Accordingly, it will be understood that various devices, components, and/or elements depicted and/or described as being in communication with each other may, for example, be embodied within a single device or distributed across multiple devices.

Referring now to FIG. 4, the apparatus 400 for providing remediation of attempted security breaches according to some example embodiments of the present invention may include or otherwise be in communication with a processor 402, a communication interface 406, and a memory device 404. As described below and as indicated by the dashed lines in FIG. 4, the apparatus 400 may also include a user interface 408, such as when the apparatus 400 is embodied by or otherwise associated with the user device 150. In some embodiments, the processor 402 (and/or co-processors or other processing circuitry assisting or otherwise associated with the processor 402) may be in communication with the memory device 404 via a bus configured to pass information among components of the apparatus 400. The memory device 404 may, for example, include one or more volatile and/or non-volatile memories. The memory device 404 may be configured to store information, data, content, applications, instructions, or the like, for enabling the apparatus 400 to carry out various functions in accordance with an example embodiment of the present invention. For example, the memory device 404 may be configured to store instructions, such as program code instructions, that, when executed by the processor 402, cause the apparatus 400 to carry out various operations.

The processor 402 may be embodied in a number of different ways. For example, the processor 402 may be embodied as one or more of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 402 may include one or more processing cores configured to perform independently. A multi-core processor may enable multiprocessing within a single physical package. Additionally or alternatively, the processor 402 may include one or more processors configured in tandem via the bus to enable independent execution of instructions, pipelining and/or multithreading.

In an example embodiment, the processor 402 may be configured to execute instructions stored in the memory device 404 or otherwise accessible to the processor 402. Alternatively or additionally, the processor 402 may be configured to execute hard coded functionality. As such, whether configured by hardware or software methods, or by a combination thereof, the processor 402 may represent an entity (e.g., physically embodied in circuitry) capable of performing operations according to an embodiment of the present invention while configured accordingly. Thus, for example, when the processor 402 is embodied as an ASIC, FPGA or the like, the processor 402 may be specifically configured hardware for conducting the operations described herein. Alternatively, as another example, when the processor 402 is embodied as an executor of software instructions, the instructions may specifically configure the processor 402 to perform the algorithms and/or operations described herein when the instructions are executed. However, in some cases, the processor 402 may be a processor of a specific device (e.g., the user device 150, compliance server 130, and/or resource server 110) configured to employ an embodiment of the present invention by further configuration of the processor 402 by instructions for performing the algorithms and/or operations described herein. The processor 402 may include, among other things, a clock, an arithmetic logic unit (ALU) and logic gates configured to support operation of the processor 402.

The communication interface 406 may be any means such as a device or circuitry embodied in either hardware or a combination of hardware and software that is configured to receive and/or transmit data from/to a network, such as the network 140, and/or any other device or module in communication with the apparatus 400. In this regard, the communication interface 406 may include, for example, an antenna (or multiple antennas) and supporting hardware and/or software for enabling communications with a wireless communication network. Additionally or alternatively, the communication interface 406 may include the circuitry for interacting with the antenna(s) to cause transmission of signals via the antenna(s) or to handle receipt of signals received via the antenna(s). Additionally or alternatively, the communication interface 406 may include one or more antennas, supporting hardware and/or software, and/or supporting circuitry for receiving and/or transmitting signals according to any short-range communication protocols and/or or standards, such as, for example, NFC, BLUETOOTH, and/or BLE. In some environments, the communication interface 406 may alternatively or also support wired communication. As such, for example, the communication interface 406 may include a communication modem and/or other hardware/software for supporting communication via cable, digital subscriber line (DSL), universal serial bus (USB) or other mechanisms.

In some embodiments, such as instances in which the apparatus 400 is embodied by or otherwise associated with the user device 150, the apparatus 400 may include a user interface 408 in communication with the processor 402 to receive indications of user input and/or to cause audible, visual, mechanical or other output to be provided to the user. As such, the user interface 408 may, for example, include a keyboard, a mouse, a joystick, a display, a touch screen, touch areas, soft keys, a microphone, a speaker, a BCI, or other input/output mechanisms and/or devices, such as any of those discussed above in the context of the input/output interfaces 225, 230 depicted in FIG. 2. The processor 402 may be configured to control one or more functions of one or more user interface elements through computer program instructions (e.g., software and/or firmware) stored on a memory accessible to the processor 402 (e.g., memory device 404). In other embodiments, however, such as in instances in which the apparatus 400 is embodied by the compliance and/or resource server 130, 110, the apparatus 400 may not include a user interface 408.

It will be further understood that in embodiments in which the apparatus 400 is embodied by or otherwise associated with the user device 150, the memory device 404 may, for example, be embodied by the memory 210 depicted in FIG. 2; the processor 402 may, for example, be embodied by the processor 205 depicted in FIG. 2; the user interface 408 may, for example, be embodied by the input and/or output interfaces 225, 230 depicted in FIG. 2; and/or the communication interface 406 may, for example, be embodied by one or more of the communications ports 220A-C depicted in FIG. 2.

Figure 5:
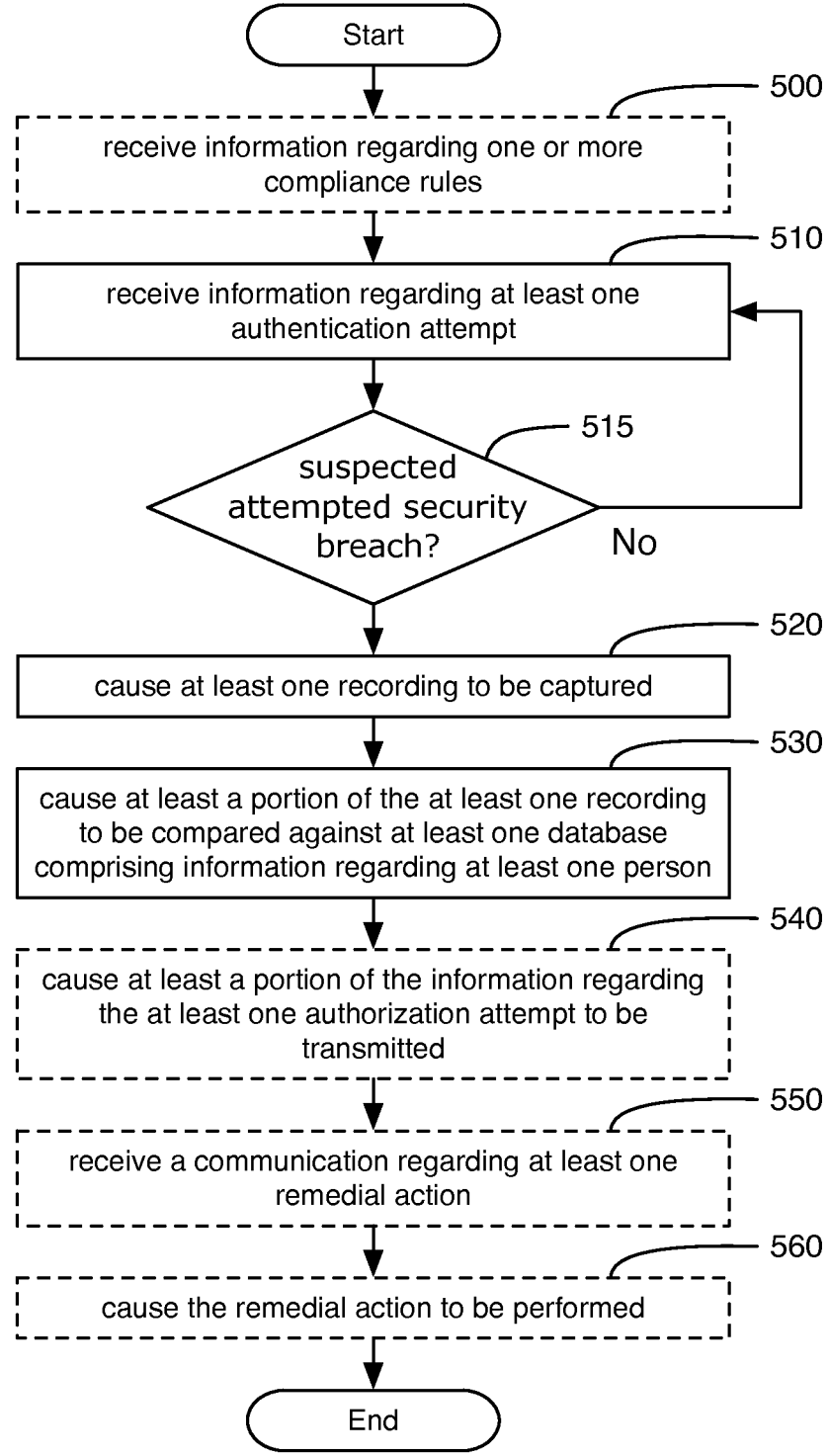
FIGS. 5 and 6 are flowcharts illustrating operations that may be performed in accordance with example embodiments of the present invention.
Figure 6:
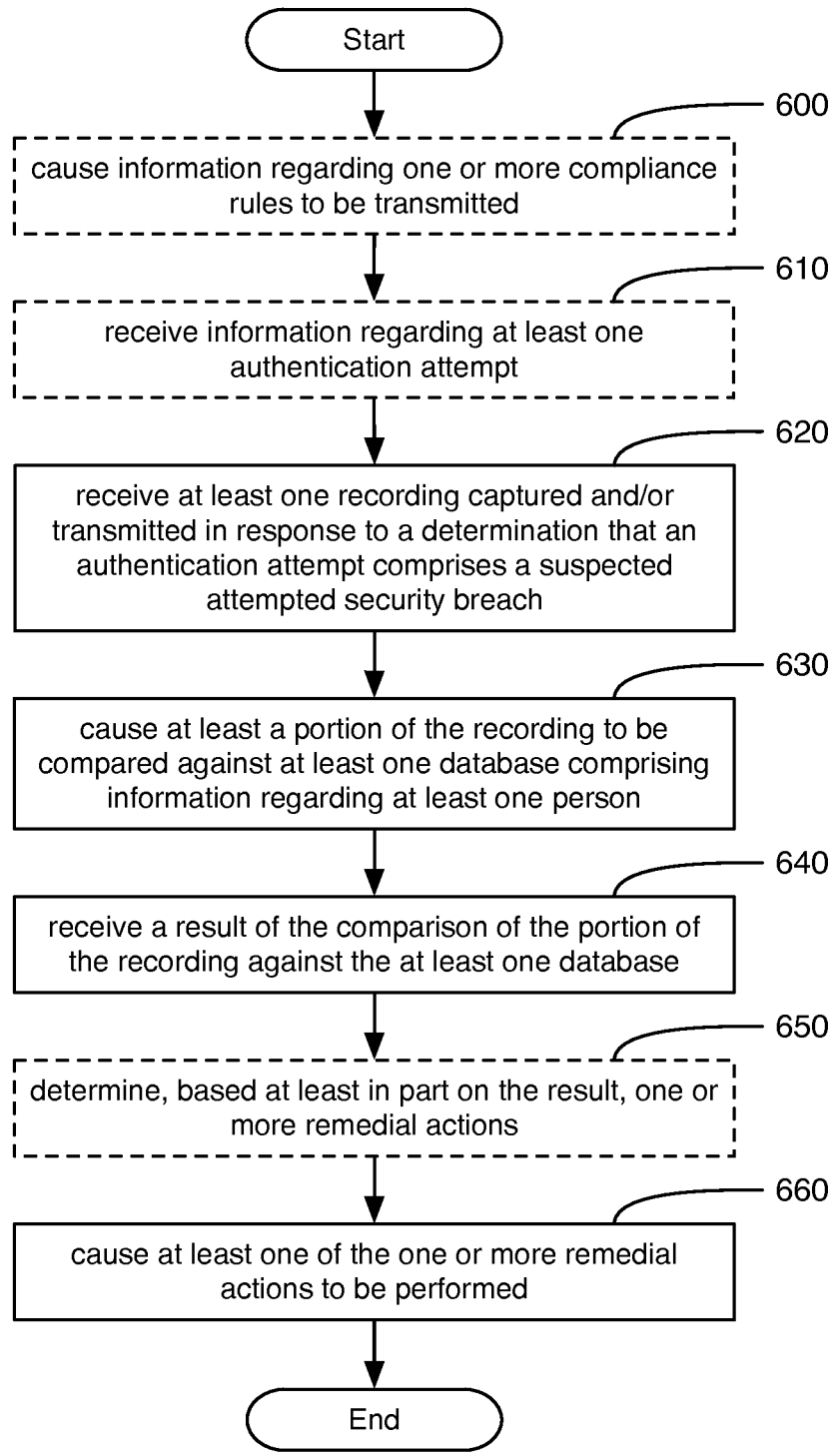

Referring now to FIGS. 5 and 6, various operations of some example embodiments of the present invention are depicted. As discussed below, the operations of FIGS. 5 and/or 6 may be performed by one or more apparatuses, such as the apparatus 400 depicted in FIG. 4, embodied by or otherwise associated with one or more of the user device(s) 150, compliance server 130, and/or resource server 110 depicted in FIG. 1, so as to provide attempted security breach remediation capabilities.

In this regard, and turning first to FIG. 5, the apparatus 400 embodied by or otherwise associated with the user device 150 may, according to some example embodiments, include means, such as the processor 402, the memory 404, the communication interface 406, and/or the like, for receiving information regarding one or more compliance rules. See operation 500. The compliance rules may, as will be discussed in more detail below, include various rules that may be used in the determination of whether a suspected attempted security breach has occurred and how to respond in an instance in which one has occurred. For example, the compliance rules may specify when the determination should be made, e.g., when a user attempts to unlock the user device 150, the user attempts to access one or more particular applications (e.g., one or more wrapped applications), and/or when the user attempts to access one or more resources of the user device 150. According to another example embodiment, the compliance rules may specify how the determination is made, e.g., by specifying a threshold number of failed authentication attempts, and/or other parameters used to determine whether an authentication attempt comprises a suspected attempted security breach.

According to some example embodiments, the apparatus 400 embodied by or otherwise associated with the user device 150 may further include means, such as the processor 402, the memory 404, the communication interface 406, the user interface 408, and/or the like, for receiving information regarding at least one authentication attempt. See operation 510. The information regarding the at least one authentication attempt may, for example, comprise authentication credentials, e.g., information used to authenticate a user. For example, the information regarding the at least one authentication attempt may comprise information provided by a user, e.g., via the user interface 408, such as a username, password, PIN, unlock pattern, or the like. According to another example embodiment, the information regarding the at least one authentication attempt may comprise authentication credentials provided by a device, such as a security fob or token; a biometric sensor, such as a fingerprint scanner, iris scanner, BCI, or other sensor configured to capture any type of biometric information; or any other device that may be used in authenticating a user. According to another example embodiment, the information regarding the at least one authentication attempt may additionally or alternatively comprise one or more indicia of a user's (e.g., the user attempting to authenticate themselves) state of mind, such as bodily indicia of their level of composure, nervousness, or the like. For example, the information regarding the at least one authentication attempt may comprise information regarding a user's pupil dilation, perspiration (e.g., skin conductance), pulse, breathing rate, brain activity (e.g., brain wave profile), or any other bodily indicia of a user's state of mind. Such bodily indicia may, for example, be captured via one or more sensing devices communicatively connected to the apparatus 400 and, according to some embodiments, housed in the user device 150. According to yet another example embodiment, the information regarding the at least one authentication attempt may additionally or alternatively comprise an indication of whether a given authentication attempt was successful or not, such as a signal from an external device configured to authenticate a user, such as the compliance server 130 or the like. According to some example embodiments, the information regarding the at least one authentication attempt may comprise contextual information such as time and/or location data, e.g., a time and/or location at which the authentication attempt occurred.

According to some example embodiments, the apparatus 400 embodied by or otherwise associated with the user device 150 may further include means, such as the processor 402, the memory 404, the communication interface 406, and/or the like, for determining whether the at least one authentication attempt comprises a suspected attempted security breach. See operation 515. The determination may, for example, be made based at least in part on the information regarding the at least one authentication attempt. For instance, one example embodiment may determine whether a threshold number of failed login attempts has been exceeded, such as be determining, based on the information regarding the at least one authentication attempt, whether the authentication attempt is a failed authentication attempt, incrementing a counter in an instance in which it is, and comparing this counter against the threshold. The apparatus 400 may thus determine that the authentication attempt comprises a suspected attempted security breach if the threshold is exceeded.

According to some example embodiments, the apparatus 400 may determine a degree of difference and/or similarity between received authentication credentials and expected, e.g., correct, authentication credentials and additionally or alternatively base the determination of whether the authentication attempt comprises a suspected attempted security breach based at least in part on the degree of difference or similarity, such as by comparing the degree of difference or similarity to a threshold. For example, if a password is being used as the authentication credentials then a high degree of similarity between the received and expected credentials may indicate a typo, as opposed to an attempted security breach, while a high degree of difference may indicate a user is attempting a security breach, e.g., by guessing passwords.

According to further example embodiments, the apparatus 400 may additionally or alternatively determine whether the at least one authentication attempt comprises a suspected attempted security breach based at least in part one or more indicia of a user's state of mind, such as any or all of the bodily indicia mentioned above. For example, some embodiments may determine one or more values of the bodily indicia and compare the one or more values against one or more thresholds. Thus, the apparatus 400 of some example embodiments may determine that a suspected attempted security breach has occurred based on one or more indicia that a user is nervous as they attempt to authenticate themselves, such as based on the person having high skin conductivity (e.g., they are sweating), an elevated pulse, and/or a brain wave profile indicative of nervousness.

According to other example embodiments, the apparatus 400 may additionally or alternatively determine whether the at least one authentication attempt comprises a suspected attempted security breach based at least in part on contextual information, such as a time or location associated with the authentication attempt. For example, a failed authentication attempt made at a suspicious hour (e.g., within or outside of one or more designated time periods) and/or in a suspicious location (e.g., within or outside of one or more geofenced areas). According to still other example embodiments, the apparatus 400 may determine whether the at least one authentication attempt comprises a suspected attempted security breach by receiving an indication from another device in communication therewith, such as from the compliance server 130, that the at least one authentication attempt comprises a suspected attempted security breach.

It will be understood that, as discussed above, the information regarding the one or more compliance rules may specify, at least in part, how the apparatus 400 determines whether a suspected attempted security breach has occurred. Thus, for example, any of the thresholds, conditions, or the like discussed in the context of the foregoing example embodiments may be provided as part of, or determined based on, the information regarding the one or more compliance rules received in operation 500. For instance, the information regarding the one or more compliance rules may provide the threshold number of failed authentication attempts, the threshold degrees of similarity and/or difference between the received and expected authentication credentials, the designated time periods and/or geofenced areas, and/or any other thresholds, conditions, or the like which may be useful in determining, in combination with the information regarding the at least one authentication attempt, a whether the at least one authentication attempt is an attempted security breach. It will be further understood that the apparatus 400 may, according to some example embodiments, be configured to determine a likelihood, e.g., a probability, that a given authentication attempt comprises an attempted security breach and may, for example, compare this against a threshold probability to determine whether the authentication attempt comprises a suspected attempted security breach. According to some example embodiments, such a threshold probability may, like the other thresholds discussed above, be received as part of (or determined based at least in part on) the information regarding the one or more compliance rules.

According to some example embodiments, the apparatus 400 embodied by or otherwise associated with the user device 150 may further include means, such as the processor 402, the memory 404, the communication interface 406, and/or the like, for causing at least one recording to be captured. See operation 520. According to some example embodiments, the recording may be caused to be captured in an instance in which the apparatus 400 has determined that a suspected attempted security breach has occurred. The apparatus 400 may, for example, cause at least one recording to be captured by one or more recording and/or sensing devices in communication with the apparatus 400 by generating and transmitting a signal to such devices, the signal comprising one or more instructions, e.g., to begin a capture procedure, and/or parameters, e.g., for performing the capture procedure. The recording and/or sensing devices may, for example, comprise one or more cameras (e.g., still, video, infrared, and/or 3D—such as time-of-flight (TOF)—cameras, and/or any other types of cameras), and/or microphones. The recording and/or sensing devices may additionally or alternatively comprise one or more biometric sensors, such as fingerprint scanners, iris scanners, and/or any other type of recording and/or sensing device configured to capture biometric data. Thus, the recording may, according to some embodiments, comprise one or more of an image, a video, a sound recording, and/or various biometric data. The apparatus 400 may further include means, such as those listed above, for receiving the recording from the one or more recording and/or sensing devices in communication therewith.

According to some example embodiments, the apparatus 400 embodied by or otherwise associated with the user device 150 may further include means, such as the processor 402, the memory 404, the communication interface 406, and/or the like, for causing at least a portion of the at least one recording to be compared against at least one database. See operation 530. According to some embodiments, causing the portion of the at least one recording to be compared against the at least one database may comprise causing the portion of the at least one recording to be transmitted to an external device, such as the compliance server 130 or resource server 110, that stores or is in communication with a device that stores the at least one database. According to some other example embodiments, the at least one database may be stored locally, such as in the memory 404 of the apparatus 400.

Regardless of where the database resides, it may, according to some example embodiments, include information regarding one or more persons. For example, the at least one database may comprise one or more employee databases (e.g., databases including information regarding one or more current and/or former employees) and/or criminal databases (e.g., databases including information regarding one or more convicted and/or accused criminals). Such databases may, for example, associate various types of personal information, such as names, contact information, or the like, to various types of identifying information. The identifying information may, for example, comprise information that may be used to identify a person in the one or more databases based at least in part on the recording captured during operation 520. For example, the identifying information for any given person in the one or more databases may comprise one or more photos of the person, one or more recordings of the person's voice, information regarding one or more of the person's fingerprints, image data regarding one or more of the person's irises, or any other types of identifying information capable of being recorded via, or derived from a recording captured via, one or more recording and/or sensing devices. Such databases may additionally or alternatively associate security information to the various types of identifying information. For example, an entry for a given person in the database may include information identifying that person as trusted, authorized, untrusted, unauthorized, or the like. The security information may further be associated with one or more particular user devices, services, locations, etc., such that a person may be trusted, authorized, untrusted, unauthorized, or the like, with respect to one or more devices, services, and/or the like. Such security information may, for example, be derived from or form the basis of one or more compliance rules, policy groups, and/or the like. Some example embodiments may employ various secure and/or privacy-preserving mechanisms, e.g., to avoid transmitting and/or storing raw identifying information. For example, the identifying information may be stored in an encrypted and/or hashed form in the at least one database and the apparatus 400 may include means, such as those mentioned above, for determining a hashed and/or encrypted version of the portion of the recording, such that hashed and/or encrypted versions of the portion of the recording may be compared. It will be understood that any or all of the information described above may be spread across a plurality of databases, including databases that might reside in different physical locations.

It will be understood that, according to some example embodiments, the apparatus 400 may perform operation 520 prior to operation 515. That is, some example embodiments may cause the at least one recording to be captured regardless of whether it is determined that the at least one authentication attempt comprises a suspected attempted security breach. Thus, some example embodiments may instead selectively perform operation 530 (causing at least a portion of the at least one recording to be compared against at least one database) in an instance in which it is determined that the at least one authentication attempt comprises a suspected attempted security breach.

According to some example embodiments, the apparatus 400 embodied by or otherwise associated with the user device 150 may further include means, such as the processor 402, the memory 404, the communication interface 406, and/or the like, for causing at least a portion of the information regarding the at least one authorization attempt received during operation 510 to be transmitted. See operation 540. The information may, for example, be transmitted to the compliance server 130. According to some example embodiments, the information may be used by an external devices, such as the compliance server 130, to determine whether the at least one authorization attempt comprises a suspected attempted security breach. This determination may, for example, be made in the same manner as discussed in the context of operation 515. Accordingly, in some example embodiments, the apparatus 400 embodied by or otherwise associated with the user device 150 may further include means, such as those discussed above, for receiving an indication of whether the authorization attempt comprises a suspected attempted security breach (operation not depicted). That is, the determination of whether an authorization attempt comprises a suspected attempted security breach may, according to some example embodiments, be made locally, e.g., by the apparatus 400 embodied by or otherwise associated with the user device 150, or externally, e.g., by the apparatus 400 embodied by or otherwise associated with another electronic devices, such as the compliance server 130. It will thus be understood that some example embodiments may perform operation 540 prior to operation 515.

According to some example embodiments, the apparatus 400 embodied by or otherwise associated with the user device 150 may further include means, such as the processor 402, the memory 404, the communication interface 406, and/or the like, for receiving a communication regarding at least one remedial action. See operation 550. The communication may, for example, comprise one or more instructions and/or parameters regarding the at least one remedial action. According to some example embodiments, the apparatus 400 embodied by or otherwise associated with the user device 150 may further include means, such as those listed above, for causing the at least one remedial action to be performed. See operation 560. The apparatus 400 may, for example, cause the remedial action to be performed in accordance with the one or more instructions and/or parameters. Such remedial actions, including examples thereof, will be discussed in further detail below in the context of FIG. 6.

It will be understood that any or all of the functionality discussed above may be provided and/or facilitated via the application-wrapping techniques discussed above in the context of FIG. 3. That is, according to some example embodiments an application may be wrapped with an application wrapper 315 configured to provide (e.g., including one or more program code portions configured to, upon execution, cause an apparatus to provide) certain wrapper-provided functionality which may, for example, include requiring user authentication before allowing access to at least a portion of the "stock" functionality provided by the underlying application 310. According to some example embodiments, the application wrapper 315 may additionally or alternatively be configured to provide (e.g., including one or more program code portions configured to, upon execution, cause an apparatus to provide) the functionality associated with any or all of operations 500, 510, 515, 520, 530, 540, 550, and/or 560, as discussed above.

Having thus described functionality that may be provided in association with a user device 150, attention will be turned to FIG. 6 to discuss corresponding functionality that may be provided in association with another electronic device, such as the compliance server 130 and/or resource server 110. In this regard, an apparatus, such as the apparatus 400 depicted in FIG. 4, may be embodied by or otherwise associated with the compliance server 130 and/or resource server 110 and may comprise means for carrying out the operations depicted in FIG. 5.

For instance, the apparatus 400 embodied by or otherwise associated with the compliance server 130 and/or resource server 110 may include means, such as the at least one processor 402, the at least one memory 404, the communication interface 406, and/or the like for causing information regarding one or more compliance rules to be transmitted, e.g., to one or more user devices 150. See operation 600. The compliance rules may, as was discussed above in the context of FIG. 5, include various rules that may be used in the determination of whether a given authentication attempt comprises a suspected attempted security breach and/or how to respond in an instance in which such a determination is made.

According to another example embodiment, the apparatus 400 embodied by or otherwise associated with the compliance server 130 and/or resource server 110 may include means, such as the at least one processor 402, the at least one memory 404, the communication interface 406, and/or the like for receiving information regarding at least one authentication attempt. See operation 610. As discussed above in the context of FIG. 5, the information may, for example, comprise authentication credentials, indicia of a user's state of mind, contextual information, and/or various other information regarding the at least one authentication attempt. The information may, for example, be received from one or more user devices 150 and/or from various other sources.

According to another example embodiment, the apparatus 400 embodied by or otherwise associated with the compliance server 130 and/or resource server 110 may include means, such as the at least one processor 402, the at least one memory 404, the communication interface 406, and/or the like for receiving at least a portion of at least one recording. See operation 620. As discussed above, the at least one recording may have been captured and/or transmitted in response to a determination that an authentication attempt comprises a suspected attempted security breach. According to some example embodiments, and as was discussed above in the context of FIG. 5, the at least one recording may comprise one or more image(s), video(s), sound recording (s), and/or various biometric data.

According to another example embodiment, the apparatus 400 embodied by or otherwise associated with the compliance server 130 and/or resource server 110 may include means, such as the at least one processor 402, the at least one memory 404, the communication interface 406, and/or the like for causing at least a portion of the recording to be compared against at least one database. See operation 630. As discussed above, the at least one database may include information regarding at least one person, such as a database associating personal and/or security information with one or more identifiers. The apparatus 400 may thus, according to an example embodiment, compare at least a portion of the at least one recording to the identifiers included in the at least one database, such as by submitting to the at least one database, one or more queries comprising and/or generated based at least in part on the portion of the at least one recording. Such queries may, according to some example embodiments, additionally include device profile information, such as information included in the device profile 252 depicted in FIG. 2, and/or user data, such as the user data 254 depicted in FIG. 2.

According to another example embodiment, the apparatus 400 embodied by or otherwise associated with the compliance server 130 and/or resource server 110 may include means, such as the at least one processor 402, the at least one memory 404, the communication interface 406, and/or the like for receiving a result of the comparison of the portion of the recording against the at least one database. See operation 640. The result may, for example, comprise information regarding one or more persons, such as one or more persons determined to match the portion of the at least one recording. Such information may, for example, be returned in response to the one or more queries mentioned above. The information may, according to some example embodiments, include one or more identifiers of one or more matching persons included in the database. According to some other example embodiments, the result may additionally or alternatively comprise security information for one or more matching persons, such as any of the security information discussed above.

It will be understood that, according to some example embodiments, multiple databases may be queried. For example, multiple databases may be queried at substantially the same time, so as to receive multiple results. According to some embodiments, multiple databases may additionally or alternatively be queried in a sequence, such as by using a result of an initial query to a database being used as the basis of a subsequent query to another (or, in some cases, the same) database. That is, some example embodiments may receive a first result from a first database, generate a query based on that result, submit the query to a second database, and receive an additional result from the second database. As a more specific example, a first database may be queried using at least a portion of the at least one recording and an identity of a person may be returned as a result. This identity may then be used as the basis of an additional query of a second database, such as a criminal database or an employee database, which may return a result such as, in the case of the criminal database, information regarding the person's criminal background or, in the case of an employee database, whether the person is authorized to access the device. This process of chaining results and queries may be repeated any number of times and with any number of databases.

According to another example embodiment, the apparatus 400 embodied by or otherwise associated with the compliance server 130 and/or resource server 110 may include means, such as the at least one processor 402, the at least one memory 404, the communication interface 406, and/or the like for determining one or more remedial actions. See operation 650. The determination may, for example, be made based at least in part on the one or more results received in operation 650. Remedial actions may, for example, include actions such as: contacting one or more persons, such as police, an owner of the user device 150, an administrator, and/or any other person; restricting access to at least a portion of the data and/or resources of the user device 150, such as by locking the user device 150 and/or encrypting or wiping at least a portion of the memory of the user device; causing one or more location services of the user device 150 to be engaged, such as by turning on one or more GPS receivers of the device; transmitting a location of the device, such as to the compliance server 130 and/or one or more persons (such as any of the previously listed persons); presenting one or more notifications, such as via an output interface 230 of the user device; triggering one or more alarms; preventing further authentication attempts; disabling one or more functions, features, and/or services of the user device 150; activating at least one activity recording service of the user device 150, such as an activity logging service; and/or any other type of action that may tend to render the device less usable, assist in recovery of the user device 150, and/or assist in apprehending a person responsible for the suspected attempted security breach. Other remedial actions may provide authentication assistance, such as by prompting the user for alternative authentication credentials, offering to change or reset existing authentication credentials, contacting technical support, and/or any other type of action that may tend to assist the user in successfully authenticating.

The determination of one or more remedial actions may further be based at least in part on one or more remedial action rules that associate one or more results with one or more remedial actions. For example, a rule may provide that in an instance in which a received result indicates a person as being unauthorized (e.g., not authorized to access the user device 150), one or more remedial actions are to be performed that may tend to render the device less usable, assist in recovery of the user device 150, and/or assist in apprehending a person responsible for the suspected attempted security breach. The same or another rule may, according to another example, provide that in an instance in which a received result indicates a person as being authorized (e.g., authorized to access the user device 150), one or more remedial actions are to be performed that may tend to provide authentication assistance. As an additional, more specific example, a remedial action rule may provide that in an instance in which a received result indicates a criminal background (e.g., in an instance in which a person responsible for the suspected attempted security breach—the person identified during operations 630 and 640—has a criminal background according to a criminal database) the user device 150 should be locked, an alarm should be triggered, the user device 150 should active a location service and begin transmitting it's current location, and police should be notified. These remedial action rules may, for example, be included in the one or more compliance rules discussed above and thus may, according to some example embodiments, be transmitted to the user device 150, e.g., during operation 600.

According to further example embodiments, the remedial actions provided in the rules may additionally be associated with one or more conditions. The conditions may, for example, comprise various types of contextual information, such as time, location, or the like. Additionally, rules may employ various logical operators and/or control flow operators, such as Boolean operators, conditional statements (e.g., if, then, else, statements), and/or the like, for increased flexibility and complexity. For example, a rule may provide that in an instance in which a received result indicates an unauthorized user or a criminal background, the user device 150 should be immediately locked and should be wiped in 5 minutes unless a user successfully authenticates. The rule may further provide that if the device is moved more than 50 feet, the device should begin transmitting it's location, contact the authorities, and immediately be wiped. A multitude of other example rules may be provided by other example embodiments.

According to another example embodiment, the apparatus 400 embodied by or otherwise associated with the compliance server 130 and/or resource server 110 may include means, such as the at least one processor 402, the at least one memory 404, the communication interface 406, and/or the like for causing at least one of the one or more remedial actions to be performed. See operation 660. Causing at least one of the one or more remedial actions to be performed may, for example, comprise causing one or more instructions to be transmitted, e.g., to the user device 150, such as instructions to perform the one or more remedial actions and/or one or more parameters, conditions, and/or the like related to the performance of the one or more remedial actions.

According to some example embodiments, instructions to perform the one or more remedial actions may not be sent to the user device. Instead, causing the one or more remedial actions to be performed may comprise causing an indication of the one or more results received in operation 640 to be transmitted, e.g., to the user device 150. According to these example embodiments, the information regarding the compliance rules discussed above in the context of operations 600 may include information regarding the remedial action rules discussed above. Thus, according to these embodiments, the apparatus 400 embodied by or otherwise associated with the user device 150 may include means, such as those discussed above in the context of FIG. 5, for determining, based at least in part on the indication of the result and the one or more remedial action rules, one or more remedial actions to be performed. The apparatus 400 may thus further include means for causing the one or more remedial actions to be performed.

Thus, some example embodiments may provide for server-side rule evaluation, with instructions being sent to the user device 150, while other example embodiments may provide for user device-side rule evaluation. Accordingly, an apparatus 400 associated with the compliance server 130 and/or resource server 110 may, according to some example embodiments, evaluate one or more remedial action rules based on one or more database query results and may cause remedial action instructions to be transmitted to a client device. According to other example embodiments, an apparatus 400 associated with the compliance server 130 and/or resource server 110 may provide remedial action rules and the result(s) of the query (or queries) to the user device 150 so that an apparatus 400 associated with the user device may evaluate the rules locally and cause appropriate remedial actions to be performed. According to still further example embodiments, a hybrid approach may be used, such that, for example, some portion of the rules are evaluated server-side and some evaluated user device-side. According to other example embodiments, some remedial actions may be caused to be performed by the apparatus 400 associated with the user device 150, while some remedial actions may be caused to be performed by the apparatus 400 associated with the compliance server 130 and/or resource server 110. Responsibility for such remedial actions may, for example, be determined based on the remedial action rules, such as by including a responsible device in the rules or by distributing to the user device 150 only those rules that should be evaluated at least in part by (and/or those rules including remedial actions that should be performed at least in part by) the user device 150.

As described above, FIGS. 5 and 6 illustrate flowcharts of example apparatuses 400, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. According to some example embodiments, such computer program instructions may be embodied as an application wrapper.

In this regard, the computer program instructions that embody the procedures described above may be stored by a memory device 404 of an apparatus 400 employing an embodiment of the present invention and executed by a processor 402 of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. For example, in some embodiments, certain ones of the operations described above may be modified or enhanced. Furthermore, in some embodiments, additional optional operations may be included. Modifications, additions, or enhancements to the operations above may be performed in any order and in any combination.

Accordingly, different combinations of elements and/or functions than those explicitly described above are also contemplated as may be set forth in some of the appended claims. Although specific terms are employed herein, they are used in a generic and descriptive sense only and not for purposes of limitation.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for controlling access to a computing device, comprising:
   defining, by an enterprise using a remote compliance server, a plurality of geofence boundaries of known suspicious locations;
   creating, at the remote compliance server, a plurality of compliance rules that define:
   restrictions for authenticating to the computing device within one of the plurality of geofence boundaries; and
   restrictions that define a manner in which the computing device must be operated to gain access to resources of the enterprise, the computing device being a user device;
   installing, at the computing device, an agent application configured to monitor operation of the computing device;
   receiving, from the compliance server by the agent application executing on the computing device, the plurality of compliance rules;
   receiving information regarding at least one authentication attempt;
   determining, using at least one processor, based at least in part on the information regarding the at least one authentication attempt, whether the at least one authentication attempt comprises a suspected attempted security breach on the computing device; and
   in an instance in which it is determined that the at least one authentication attempt comprises a suspected attempted security breach:
      causing at least one recording to be captured via at least one recording device communicatively coupled to the at least one processor,
      causing at least a portion of the at least one recording to be compared against at least one database, the database comprising information regarding at least one person,
      transmitting a command to the agent application executing on the computing device to turn on a global positioning sensor on the computing device in response to determining that the at least one authentication attempt comprises a suspected attempted security breach;
      determining whether the computing device is located within one of the defined geofence boundaries identifying a suspicious location, based on a location of the computing device determined using the global positioning sensor,
      transmitting the location of the computing device to the remote compliance server;
      locking the computing device and initiating a countdown timer when the comparison indicates a suspected attempted security breach and when the computing device is within one of the defined geofence boundaries, and
      automatically wiping data from the computing device when the countdown timer expires without completing a successful authentication attempt.

2. The method of claim 1, wherein:
   determining whether the authentication attempt comprises a suspected attempted security breach comprises:
      determining whether the failed authentication attempt exceeds a threshold number of failed authentication attempts.

3. The method of claim 1, further comprising:
   presenting an alternative authentication option to a user of the computing device when the recording indicates the user is an authorized user.

4. The method of claim 1, wherein:
   the authentication attempt comprises an attempt to obtain authorization to access a wrapped mobile application, the wrapped mobile application comprising stock functionality and wrapper-provided functionality; and determining whether the authentication attempt comprises a suspected attempted security breach comprises determining, via the wrapper-provided functionality, whether the authentication attempt comprises a suspected attempted security breach.

5. The method of claim 1, wherein:
the at least one database comprising information regarding at least one person comprises a criminal database.

6. The method of claim 1, wherein:
the at least one database comprising information regarding at least one person comprises an employee database.

7. The method of claim 1, wherein:
causing at least a portion of the at least one recording to be compared against the at least one database comprises causing the at least one recording to be transmitted to a compliance server in communication with the at least one database.

8. The method of claim 1, wherein:
the at least one recording comprises a photograph.

9. The method of claim 1, wherein:
the at least one recording comprises biometric data.

10. The method of claim 9, wherein:
the biometric data comprises fingerprint data.

11. The method of claim 9, wherein:
the biometric data comprises iris image data.

12. The method of claim 1, further comprising:
causing, following causing the at least a portion of the at least one recording to be compared against the at least one database, a remedial action to be performed, the remedial action having been determined based at least in part on at least one result of comparing the at least one recording against the at least one database.

13. An apparatus comprising at least one processor and at least one memory storing program code instructions, the at least one memory and program code instructions being configured to, with the at least one processor, direct the apparatus to at least:
install an agent application configured to monitor operation of the apparatus;
receive, from a remote compliance server by the agent application, a plurality of compliance rules defined by an enterprise and including:
restrictions for authenticating to the apparatus within one of a plurality of geofence boundaries of known suspicious locations; and
restrictions that define a manner in which the apparatus must be operated to gain access to resources of the enterprise, the apparatus being a user device;
receive information regarding at least one authentication attempt;
determine, based at least in part on the information regarding the at least one authentication attempt, whether the at least one authentication attempt comprises a suspected attempted security breach; and
in an instance in which it is determined that the at least one authentication attempt comprises a suspected attempted security breach:
cause at least one recording to be captured via at least one recording device communicatively coupled to the at least one processor,
cause at least a portion of the at least one recording to be compared against at least one database, the database comprising information regarding at least one person,
receive a command to turn on a global positioning sensor on the apparatus in response to determining that the at least one authentication attempt comprises a suspected attempted security breach,
determine whether the apparatus is located within one of the defined geofences identifying a suspicious location, based on a location of the computing device determined using the global positioning sensor,
cause a countdown timer to begin executing when the comparison indicates a suspected attempted security breach and when the apparatus is located within one of the defined geofence boundaries, and
cause at least one remedial action to be automatically performed upon expiration of the countdown timer without completing a successful authentication attempt, the at least one remedial action having been determined based at least in part on at least one result of comparing the at least one recording against the at least one database.

14. The apparatus of claim 13, wherein:
the authentication attempt comprises an attempt to obtain authorization to access at least one resource of a mobile device.

15. The apparatus of claim 14, wherein:
the at least one remedial action comprises restricting access to at least a portion of the mobile device.

16. The apparatus of claim 14, wherein:
the at least one remedial action comprises activating at least one location service of the mobile device.

17. The apparatus of claim 14, wherein:
the at least one remedial action comprises deleting data stored in a memory of the mobile device.

18. The apparatus of claim 13, wherein:
the at least one remedial action is further determined based at least in part on one or more remedial action rules.

19. The apparatus of claim 18, wherein:
the at least one remedial action is further determined based at least in part on contextual information.

20. A computer program product comprising a non-transitory computer-readable storage medium having program code portions embodied therein, the program code portions being configured to, upon execution, direct an apparatus to at least define, by an enterprise using a remote compliance server, a plurality of geofence boundaries of known suspicious locations; create, at the remote compliance server, a plurality of compliance rules that define: restrictions for authenticating to the computing device within one of the plurality of geofence boundaries; and restrictions that define a manner in which the computing device must be operated to gain access to resources of the enterprise, the computing device being a user device; install, at the computing device, an agent application configured to monitor operation of the computing device; receive, from the compliance server by the agent application executing on the computing device, the plurality of compliance rules; receive information regarding at least one authentication attempt; determine, using at least one processor, based at least in part on the information regarding the at least one authentication attempt, whether the at least one authentication attempt comprises a suspected attempted security breach on the computing device; and in an instance in which it is determined that the at least one authentication attempt comprises a suspected attempted security breach: cause at least one recording to be captured via at least one recording device communicatively coupled to the at least one processor, cause at least a portion of the at least one recording to be compared against at least one database, the database comprising information regarding at least one person, transmit a command to the agent application executing on the computing device to turn on a global positioning sensor on the computing device in response to determining that the at least one authentication attempt comprises a suspected attempted security breach; determine whether the computing device is located within one of the defined geofence boundaries identifying a suspicious location, based on a location of the computing device determined using the global positioning sensor, transmit the location of the computing device to the remote compliance server; lock the computing device and initiate a countdown timer when the comparison indicates a suspected attempted security breach and when the computing device is within one of the defined geofence boundaries, and automatically wipe data from the computing device when the countdown timer expires without completing a successful authentication attempt.

* * * * *